(12) United States Patent
Seitz

(10) Patent No.: US 10,668,958 B2
(45) Date of Patent: Jun. 2, 2020

(54) MOTOR VEHICLE HAVING A FRONT APRON HAVING DUCT-LIKE AIR-GUIDING DEVICES

(71) Applicant: Bayerische Motoren Werke Aktiengesellschaft, Munich (DE)

(72) Inventor: Christian Seitz, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/581,792

(22) Filed: Apr. 28, 2017

(65) Prior Publication Data
US 2017/0282980 A1 Oct. 5, 2017

Related U.S. Application Data

(63) Continuation of application No. PCT/EP2015/074664, filed on Oct. 23, 2015.

(30) Foreign Application Priority Data

Oct. 31, 2014 (DE) .......................... 10 2014 222 268

(51) Int. Cl.
- *B60J 9/00* (2006.01)
- *B62D 35/00* (2006.01)
- *B62D 35/02* (2006.01)

(52) U.S. Cl.
CPC ........... *B62D 35/005* (2013.01); *B62D 35/02* (2013.01); *Y02T 10/82* (2013.01); *Y02T 10/88* (2013.01)

(58) Field of Classification Search
CPC ..... B64C 27/20; B64C 27/08; B64C 29/0025; A63H 17/26; A63H 30/04; B60K 11/04;
(Continued)

(56) References Cited

U.S. PATENT DOCUMENTS 3,933,136 A * 1/1976 Burst ................... B60K 11/08
  123/41.58
4,131,308 A * 12/1978 Holka .................. B62D 35/005
  296/180.5
(Continued)

FOREIGN PATENT DOCUMENTS

DE  32 45 410 A1  6/1984
DE  197 05 268 A1  8/1998
(Continued)

OTHER PUBLICATIONS

International Search Report (PCT/ISA/210) issued in PCT Application No. PCT/EP2015/074664 dated Jan. 5, 2016 with English translation (eight pages).
(Continued)

*Primary Examiner* — Kiran B Patel
(74) *Attorney, Agent, or Firm* — Crowell & Moring LLP

(57) ABSTRACT

A motor vehicle includes a body having a front apron, and an underbody. The body forms at least one left and one right front wheel house for receiving one front wheel each. The air-guiding devices have at least one left flow duct and at least one right flow duct. The at least one left flow duct opens in the underbody in front of the left wheel house. The at least one right flow duct opens in the underbody in front of the right wheel house. The respective exit opening is arranged in front of that region of the respective wheel house which is adjacent to the inner side, which faces the vehicle central plane, of the respective vehicle wheel in the straight-ahead position.

11 Claims, 8 Drawing Sheets

(58) Field of Classification Search
CPC .. B60K 11/08; B60K 17/356; A01D 2101/00; B60T 5/00
See application file for complete search history.

(56) References Cited

U.S. PATENT DOCUMENTS

| | | | | |
|---|---|---|---|---|
| 4,159,140 | A * | 6/1979 | Chabot | B62D 35/005 105/1.3 |
| 4,460,213 | A * | 7/1984 | Janssen | B60K 11/085 296/180.5 |
| 4,673,206 | A * | 6/1987 | Kretschmer | B62D 35/005 296/180.1 |
| 4,723,594 | A * | 2/1988 | Koehr | B60K 11/04 123/196 AB |
| 4,772,062 | A * | 9/1988 | Janssen | B62D 35/007 296/180.5 |
| 4,805,747 | A * | 2/1989 | Moedinger | F16D 65/847 188/264 A |
| 4,938,303 | A * | 7/1990 | Schaal | B60H 1/3227 123/41.48 |
| 6,033,010 | A | 3/2000 | Preiss | |
| 6,405,819 | B1 * | 6/2002 | Ohkura | B60K 11/08 180/68.1 |
| 7,380,869 | B2 * | 6/2008 | Nakaya | B62D 25/182 296/180.1 |
| 8,091,516 | B2 * | 1/2012 | Preiss | B60K 11/04 123/41.05 |
| 8,297,685 | B2 * | 10/2012 | Wolf | B62D 35/005 296/180.1 |
| 8,544,583 | B2 * | 10/2013 | Ajisaka | B60K 11/08 180/68.1 |
| 8,571,749 | B2 * | 10/2013 | Kawato | B60K 11/085 123/41.04 |
| 9,199,674 | B2 * | 12/2015 | Wolf | B60K 11/08 |
| 10,059,291 | B2 * | 8/2018 | Kishima | B60R 19/48 |
| 2003/0173798 | A1 | 9/2003 | Steinicke et al. | |
| 2005/0116508 | A1 | 6/2005 | Sebastian | |
| 2007/0023238 | A1 * | 2/2007 | Ramsay | B60T 5/00 188/71.6 |
| 2012/0068498 | A1 | 3/2012 | Wolf | |
| 2012/0071075 | A1 * | 3/2012 | Wolf | B60T 5/00 454/162 |
| 2013/0248265 | A1 * | 9/2013 | Wolf | B60K 11/085 180/68.1 |
| 2016/0016617 | A1 * | 1/2016 | Wolf | B62D 37/02 296/208 |
| 2016/0176450 | A1 * | 6/2016 | Wolf | B60K 11/04 180/68.2 |
| 2018/0244325 | A1 * | 8/2018 | Harter | B62D 35/005 |

FOREIGN PATENT DOCUMENTS

| | | |
|---|---|---|
| DE | 100 45 640 A1 | 3/2002 |
| DE | 101 59 783 A1 | 6/2003 |
| DE | 102 13 650 A1 | 10/2003 |
| DE | 10 2007 023 231 A1 | 11/2008 |
| DE | 10 2007 045 004 A1 | 4/2009 |
| DE | 10 2008 019 923 A1 | 10/2009 |
| DE | 10 2009 040 678 A1 | 4/2010 |
| EP | 1 538 069 A1 | 6/2005 |
| FR | 2 858 796 A1 | 2/2005 |
| JP | 2014-76704 A | 5/2014 |

OTHER PUBLICATIONS

German-language Written Opinion (PCT/ISA/237) issued in PCT Application No. PCT/EP2015/074664 dated Jan. 5, 2016 (six pages).
German Search Report issued in counterpart German Application No. 10 2014 222 268.0 dated Sep. 11, 2015 with partial English translation (13 pages).

* cited by examiner

MOTOR VEHICLE HAVING A FRONT APRON HAVING DUCT-LIKE AIR-GUIDING DEVICES

CROSS REFERENCE TO RELATED APPLICATIONS

This application is a continuation of PCT International Application No. PCT/EP2015/074664, filed Oct. 23, 2015, which claims priority under 35 U.S.C. § 119 from German Patent Application No. 10 2014 222 268.0, filed Oct. 31, 2014, the entire disclosures of which are herein expressly incorporated by reference.

BACKGROUND AND SUMMARY OF THE INVENTION

Embodiments of the present invention relate to a motor vehicle, and in particular to a motor vehicle having a body having a front apron and an underbody, in which the body forms at least one left and one right front wheel house for receiving one front wheel each, and in which duct-like air-guiding devices are provided in the front apron, said air-guiding devices having an air inlet in the region of the front of the vehicle and an air outlet in the region of the underbody.

Various cooling air openings are provided in the front apron of modern motor vehicles. A lower cooling air inlet, openings for removed radiators and for brake cooling ducts are frequently located in the lower part of the front apron. In the region of the respective side of the vehicle to provide openings through which air is guided into the front outer edge of the respective wheel house in order to form a vertical air curtain laterally outside the front wheel. Such an air curtain deflects the relative wind past the front wheel and thereby reduces the air vortices in the region of the front wheel.

DE 32 45 410 A1 provides an air inlet opening of a flow duct in the front apron of a vehicle transversally over the width of the vehicle, the flow duct deflecting the entering air flow downward to the underbody in the region of the front apron and allowing the air to escape in a specific manner in the direction of travel. As a result, the intention, by means of the flat air jet, is for a type of spoiler to be formed in the region of the front apron, the spoiler deflecting the relative wind around the vehicle.

DE 10 2007 045 004 A1 presents and describes an air-guiding device in the form of a wheel spoiler which is arranged in front of the front wheel of a vehicle and is situated in the flow that shields the front wheel against the incident relative wind. The wheel spoiler is provided with one or more guiding fins which are intended to channel the flow in the region of the wheel and the wheel house in order thereby to minimize air vortices occurring at a wheel spoiler.

FR 2 858 796 A1 presents and describes an air-guiding device in the front of a vehicle, which air-guiding device comprises an air-guiding duct which extends from the front of the vehicle to shortly before the wheel house of the front wheel and, in a region directly in front of the wheel, opens downward in the direction of the carriageway. The mouth here is configured in such a manner that the exiting air in front of the wheel in the straight-ahead position exits at an angle to the perpendicular toward the carriageway and toward the outer side of the vehicle. As a result, the front wheel is intended to be protected against direct impinging of the relative wind against the wheel, and the vortices of the relative wind caused by the rotating vehicle wheel are intended to be reduced. A component of the vehicle, namely the front wheel, is therefore shielded here by the deflection of a partial flow of the relative wind impinging against the vehicle.

DE 10 2009 040 678 A1 discloses a wheel spoiler which extends on the underbody of the vehicle in front of a front wheel and a front wheel house in the transverse direction of the vehicle and which has an inner portion with a spoiler-lip separation edge not running rectilinearly, said portion extending in front of the inner free part of the wheel house, and therefore said portion is arranged substantially away from overlapping with an inner tire flank, as seen in the direction of flow. This spoiler lip with an uneven separation edge is intended to shield the region of the wheel house between the inner tire flank in the straight-ahead position of the wheel and the inner side of the wheel house against incident air. The ram lip which is formed by the wheel spoiler and has a non-rectilinear contour is intended to bring about a change in the flow, in particular by having an influence on the shearing layer, wherein the intention is to obtain a reduction in the inflow into the wheel house by means of local changes in the flow speed and the flow orientation at the non-rectilinear contour.

SUMMARY OF THE INVENTION

One of the objects of the embodiments of the present invention is to design a motor vehicle of the type in question in such a manner that the aerodynamics of the motor vehicle in the region of the wheel house are further improved in order to reduce the air resistance of the vehicle.

This and other objects are achieved by a motor vehicle of the type in question, in which the air-guiding devices have at least one left flow duct and at least one right flow duct, in which the at least one left flow duct opens in the underbody in front of the left wheel house and the at least one right flow duct opens in the underbody in front of the right wheel house, and in which the respective exit opening forming the air outlet is designed in such a manner that the air flowing through the flow duct exits counter to the direction of travel with a direction component downward. The respective exit opening is arranged in front of that region of the respective wheel house which is adjacent to the inner side, which faces the vehicle central plane, of the respective vehicle wheel in the straight-ahead position.

In accordance with the inventive motor vehicle, the particular position of the respective exit opening cause the channeled air emerging from the exit opening of the flow duct to deflect the relative wind air flowing freely along under the underbody of the vehicle in front of that part of the wheel house which is adjacent to the inner side of the wheel downward, i.e. toward the carriageway. This gives rise under that free part of the wheel house which is not taken up by the vehicle wheel in the straight-ahead position to a horizontal air curtain which reduces vortices of the relative wind flowing along under the vehicle in the wheel house, in particular at the wheel suspension and steering components, and thus reduces the flow resistance of the motor vehicle. An additional reduction in the flow resistance is provided by the air entry openings of the flow duct, said air entry openings forming the air inlet, since air entry openings reduce the vehicle end surface.

In stark contrast to existing motor vehicles that use wheel spoilers, in the inventive motor vehicle a partial flow is introduced into the underbody flow (virtual discharge), wherein the discharged partial flow brings about a deflection of the underbody flow and therefore a shielding or a "virtual sealing" of the open part of the wheel house. In addition, by means of a corresponding configuration of the duct, the partial flow flowing through the duct can be accelerated, which results in turn in an acceleration of the underbody flow at the duct outlet. Therefore, in stark contrast to existing motor vehicles, in the inventive motor vehicle no component located in the flow is shielded; instead, the flow passes over an opening present in the vehicle underbody and said opening is virtually closed off or "virtually sealed".

Advantageously, the position of the respective exit opening and the extent thereof in the transverse direction of the vehicle may be dimensioned in such a manner that the exit opening takes up or overlaps the distance from the inner side, which faces toward the vehicle center plane, of the respective vehicle wheel in the straight-ahead position as far as the inner side of the wheel house, the inner side facing the respective vehicle wheel, i.e. the entire width of that free part of the wheel house which is not taken up by the vehicle wheel in the straight-ahead position. The extent of the exit opening in the transverse direction of the vehicle is therefore not smaller here than the width of the free part of the wheel house. By this means, that free part of the wheel house which is adjacent to the inner side of the wheel is reliably shielded over its entire width with the horizontal air curtain, and vortices of the vehicle underflow are thus substantially suppressed in the free part of the wheel house.

Additionally, the respective exit opening may have an exit cross section provided, at least on one longitudinal side, with a contour differing from a straight line. This contour differing from the straight line can be of stepped, zigzag-shaped or wavy design or is provided with convex bulges lying laterally against one another.

Alternatively or in addition, the respective exit opening may be of rectangular design in outline and is preferably arranged at a right angle to the vehicle central plane. However, it is also possible for the respective exit opening to be of curved or sickle-shaped design in outline, wherein its curvature preferably substantially corresponds to the curvature of the front edge of the wheel house, as viewed in outline, or is approximate to said curvature. It is also possible for only the rear edge of the exit opening, which edge is adjacent to the wheel house, to be of curved or sickle-shaped design and for it to be matched to the curvature of the front edge of the wheel house.

Advantageously, at least one vortex-generating element may be provided upstream of the exit opening in the respective flow duct. Said vortex-generating element can be, for example, a triangular vortex generator or in region of the flow duct upstream of the exit opening that is designed as a countersunk inlet.

Further, a ram lip or a displacer which protrudes downward from the underbody may be provided on or in front of the front edge of the respective exit opening. Said optional ram lip in front of the exit opening of the duct facilitates the discharge of the partial flow conducted through the duct by a local negative pressure being produced at the duct outlet by the provision of the ram lip or of the displacer.

Advantageously, the upper wall of the flow duct can be of concave, convex or concave-convex design in the region of the respective exit opening.

Alternatively or in addition, the upper wall of the flow duct can also have a concavely, convexly or concavely-convexly curved profile over the course of the flow duct.

BRIEF DESCRIPTION OF THE DRAWINGS

Other objects, advantages and novel features of the embodiments of the present invention will become apparent from the following detailed description of at least one embodiment when considered in conjunction with the accompanying drawings, in which:

FIG. 17A is an illustration according to FIG. 17 with a vortex flow drawn in;

FIG. 18A is an illustration of FIG. 18 with a vortex flow drawn in;

FIG. 19A is an illustration of FIG. 19 with a vortex flow drawn in, and

DETAILED DESCRIPTION OF THE DRAWINGS

Figure 1:
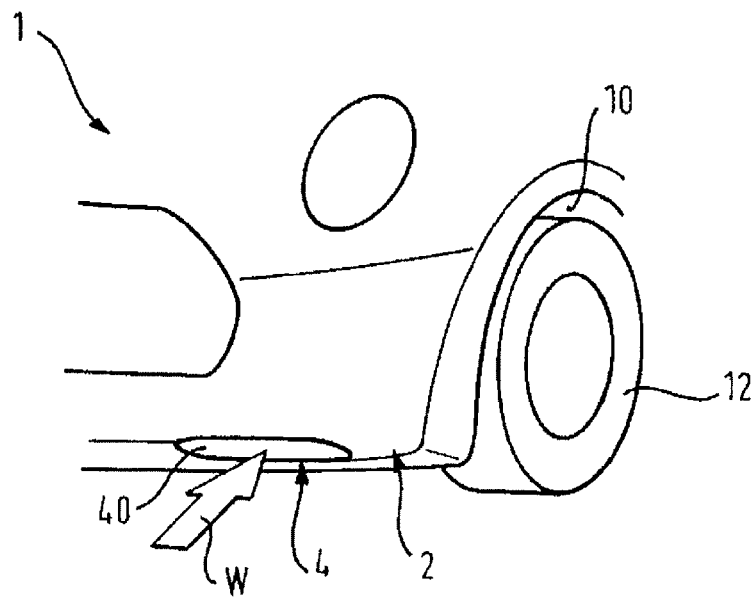
FIG. 1 is a schematic, perspective and sectioned view of a motor vehicle obliquely from the front on the left.
Figure 3:
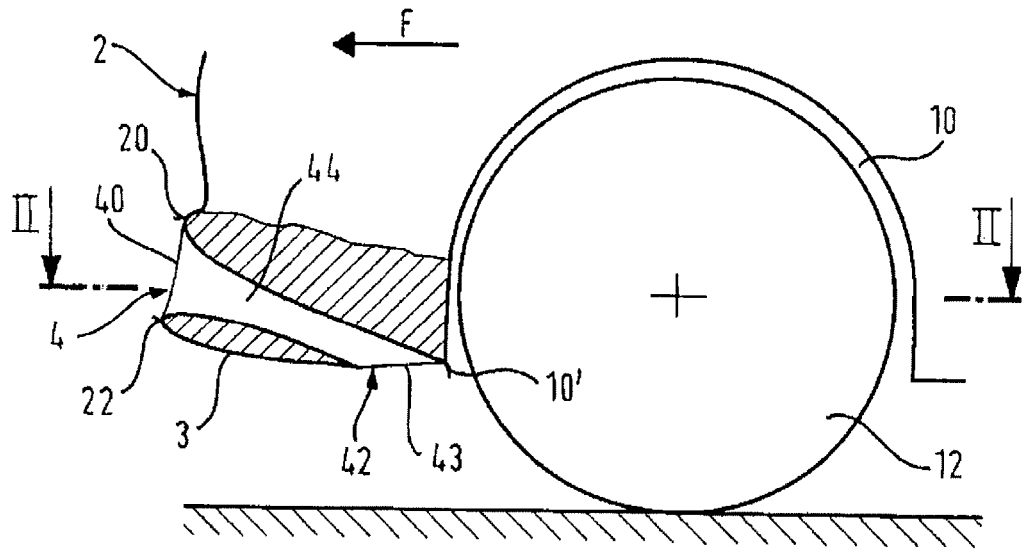
FIG. 3 is a partially sectioned side view of the front left part of a motor vehicle.

FIG. 1 is a greatly simplified illustration of the front left side of a motor vehicle in a perspective view. The motor vehicle comprises a body 1 having a front apron 2 and an underbody 3 (FIG. 3). The body 1 in a conventional manner forms a left wheel house 10 for receiving a left front wheel 12. Although only the left front side of the motor vehicle is illustrated in FIG. 1, the explanations in this regard also apply, of course, to the right side of the vehicle which is constructed mirror-symmetrically with respect thereto.

Duct-like air-guiding devices 4 are provided in the front apron 2, said air-guiding devices each having an air inlet 40 in the region of the front of the vehicle for some of the relative wind W impinging on the front apron 2, and having an air outlet 42 (FIG. 3) in the region of the underbody. Although only the left air-guiding device 4 is shown in FIG. 1, a correspondingly configured air-guiding device is also provided mirror-symmetrically with respect thereto on the right side.

Figure 2:
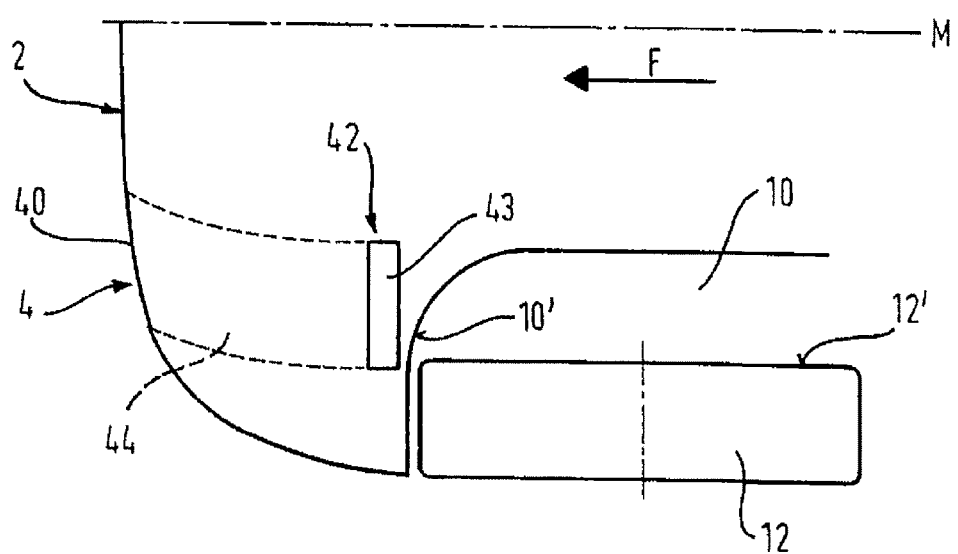
FIG. 2 is a schematic horizontal section through the front left part of a motor vehicle along the line II-II in FIG. 3.

FIG. 2, which reproduces a simplified horizontal section through the front apron 2 of the vehicle shown in FIG. 1, shows the profile of the left flow duct 44 of the air-guiding device 4. The flow duct 44 runs from the air inlet 40 in the front apron 2 through the front apron 2 toward the front region of the underbody 3 in which the air outlet 42 of the left flow duct 44 is formed by a corresponding exit opening 43 in the underbody 3. Said air outlet 42 is located in the underbody just before the front edge 10' of the wheel house 10, as seen in the direction of travel F.

As can readily be seen in FIG. 2, the exit opening 43, which forms the air outlet 42, of the left flow duct 44 lies, as viewed in the transverse direction of the vehicle, adjacent to the inner side 12', which faces toward the vehicle central plane M, of the left front vehicle wheel 12 in a straight-ahead position. The exit opening 43 extends in the transverse direction of the vehicle, i.e. perpendicularly to the vehicle central plane M, over the entire width of that free part of the wheel house 10 which is not taken up by the vehicle wheel 12 in the straight-ahead position, i.e. from the inner side 12' of the front vehicle wheel 12 in the straight-ahead position as far as the inner side, which faces toward the vehicle wheel 12, of the wheel house 10, or slightly beyond the latter, as can be seen in FIG. 2. The air flowing out of the exit opening 43 is therefore not conducted onto the front vehicle wheel 12, but rather is conducted laterally next to the front vehicle wheel 12, specifically next to the inner side 12' of the vehicle wheel 12, as is explained in more detail further below.

FIG. 3 shows a side view of the front part of the motor vehicle which is partially illustrated in FIG. 1, wherein the front apron 2 is cut open in the region of the flow duct 44. It can readily be seen in this figure that the flow duct 44 of the duct-like air-guiding device 4 runs from the air inlet 40 obliquely downward to the air outlet 42 which is formed by the exit opening 43 in the underbody 3, until just in front of the front edge 10' of the wheel house 10.

Figure 3A:
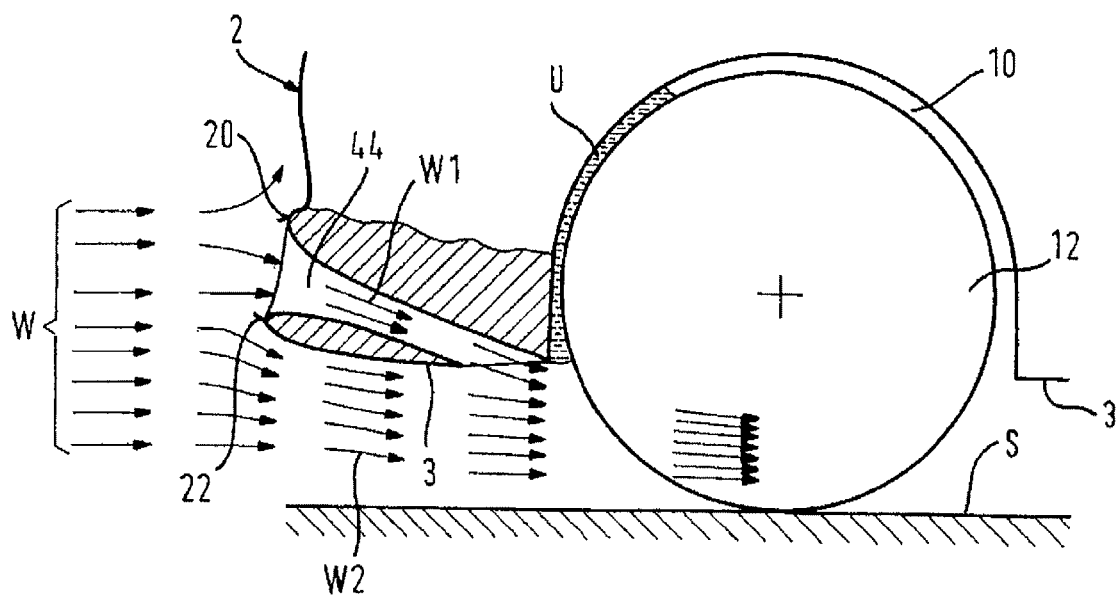
FIG. 3A is the view of FIG. 3 with flow arrows shown.

In FIG. 3A which corresponds to FIG. 3, the profile of the flow caused by the relative wind W through the flow duct 44 and along under the underbody 3 of the vehicle can be seen. The relative wind flow W impinging on the front apron 2 is divided at corresponding front edges 20, 22 of the front apron 2 above and below the air inlet 40, and therefore some of the relative wind which is not deflected upward or to the side by the front apron 2 is conducted through the flow duct 44. This duct flow, denoted by W1, of the relative wind exits downward again through the exit opening 43, which forms the air outlet 42, of the flow duct 44 on the underbody 3 along the direction of travel F with a direction component caused by the flow duct 44 running obliquely rearward and downward and impinges there against the underflow W2 produced by the relative wind W under the underbody 3 of the vehicle. In the region shortly before the wheel house 10, in which the duct flow W1 impinges against the underflow W2 in a manner directed obliquely rearward and downward, the underflow W2 is deflected downward by the duct flow W1 in the direction of the carriageway surface S. This is symbolized by the two right vertical arrow columns in FIG. 3A. This deflection of the underflow in the direction of the carriageway surface S prevents substantial parts of the underflow W2 from being sucked into the wheel house by the negative pressure formed in the wheel house 10 in front of the front vehicle wheel 12 in the direction of travel and swirling in said wheel house. The duct flow W1 exiting from the flow duct 44 therefore deflects the underflow W2 downward in the direction of the carriageway surface S and therefore past the negative pressure field U formed in the wheel house in front of the front wheel. As a result, the vortices of the underflow W2 in the wheel house 10 are significantly reduced and therefore the flow losses are reduced in this region, as a result of which the air resistance of the motor vehicle is likewise reduced.

FIGS. 4 to 7 show alternative cross-section forms of the exit opening 43 to the rectangular embodiment of the exit opening 43 that is illustrated in FIG. 2.

Figure 4:
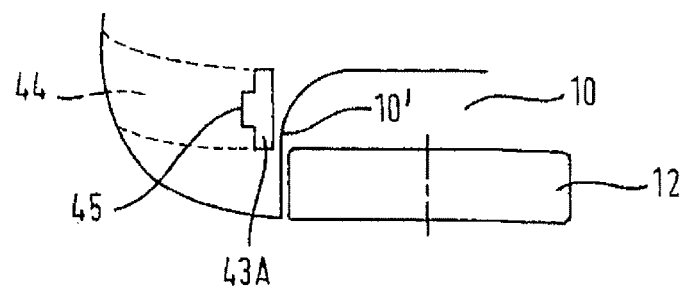
FIG. 4 is a view of FIG. 2 with a first modified geometry of the outlet opening.

In FIG. 4, the contour 43A of the exit opening is provided at its front edge in the direction of travel F with a central, step-like enlargement 45 of the exit cross section.

Figure 5:
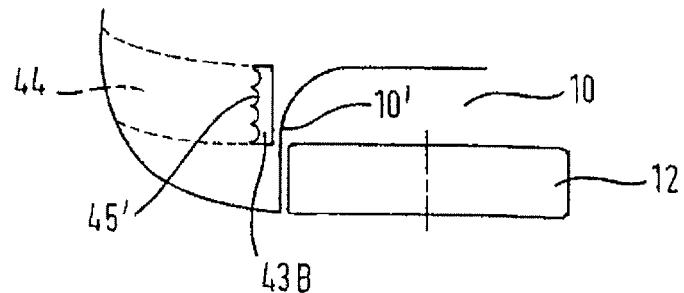
FIG. 5 is a view of FIG. 2 with a second modified geometry of the outlet opening.

In FIG. 5, the contour 43B of the exit opening is provided on its front edge in the direction of travel F with convex bulges 45' which lie next to one another and locally constrict the exit cross section.

Figure 6:
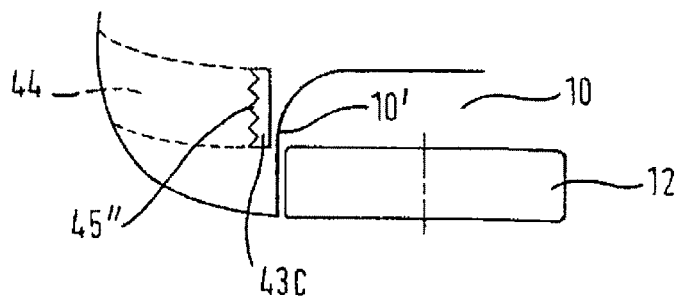
FIG. 6 is a view of FIG. 2 with a third modified geometry of the outlet opening.

FIG. 6 illustrates a variant of the exit opening 43 with a differing contour 43C in which the front edge, in the direction of travel F, of the exit opening 43 is designed as a zigzag-shaped edge 45".

Figure 7:
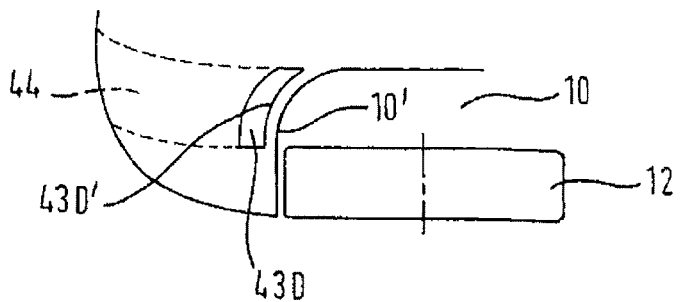
FIG. 7 is a view according to FIG. 2 with a fourth modified geometry of the outlet opening.

FIG. 7 shows a further alternative of the exit opening 43 with a curved contour 43D which is of curved design in outline, wherein the curvature of the contour 43D, in particular in the region of the rear edge 43D' of the exit opening 43, substantially corresponds to the curvature of the front edge 10' of the wheel house 10, i.e. runs parallel to the curved front edge 10' of the wheel house 10. By this means, an optimal design of the horizontal air curtain below the wheel house 10 is achieved.

FIGS. 8 to 11 correspond to the partially sectioned view of FIG. 3 and show different duct geometries.

Figure 8:
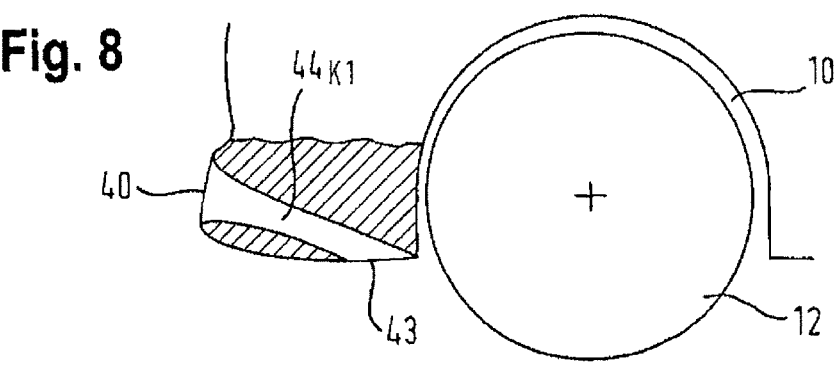
FIG. 8 is a side view according to FIG. 3 with a first duct geometry.

The duct geometry of the flow duct 44 of FIG. 8 substantially corresponds to that in FIG. 3, wherein the exit opening 43 is, however, slightly larger than in the example of FIG. 3. The flow duct $44_{K1}$ is somewhat constricted in cross section in its central portion and thereby forms a venturi tube in which the duct flow is accelerated. The flow duct $44_{K1}$ runs substantially with a rectilinear duct axis from the air inlet 40 obliquely rearward and downward to the exit opening 43.

Figure 9:
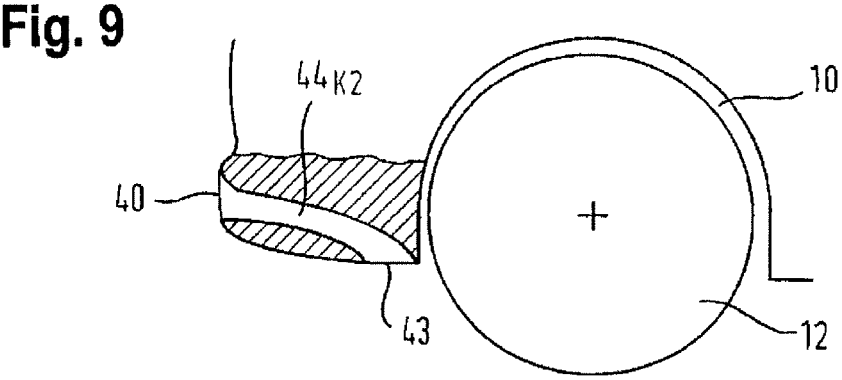
FIG. 9 is a side view according to FIG. 3 with a second duct geometry.

The flow duct $44_{K2}$ illustrated in FIG. 9 runs substantially parallel without the constriction typical of a venturi tube and, in its rear region just in front of the exit opening 43, has a significantly downwardly directed curvature.

Figure 10:
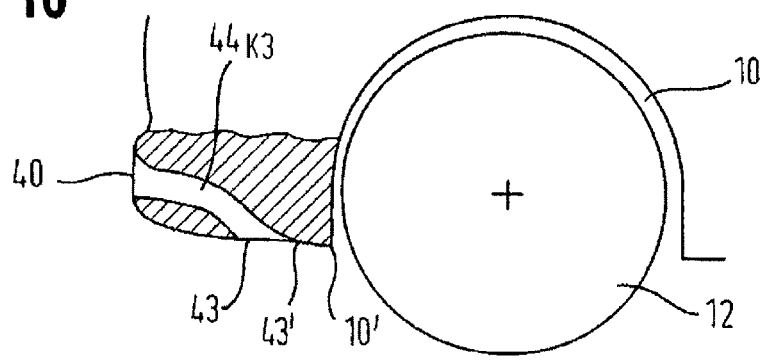
FIG. 10 is a side view according to FIG. 3 with a third duct geometry.

The duct geometry, which is shown in FIG. 10, of the flow duct $44_{K3}$ runs from the air inlet 40 to the exit opening 43 in a narrower downwardly directed curve than in the example of FIG. 9, wherein the exit opening 43 lies significantly in front of the front edge 10' of the wheel house 10. The distance of the rear edge 43' of the exit opening 43 from the front edge 10' of the wheel house 10 corresponds here approximately to the width (as measured in the direction of travel) of the exit opening 43.

Figure 11:
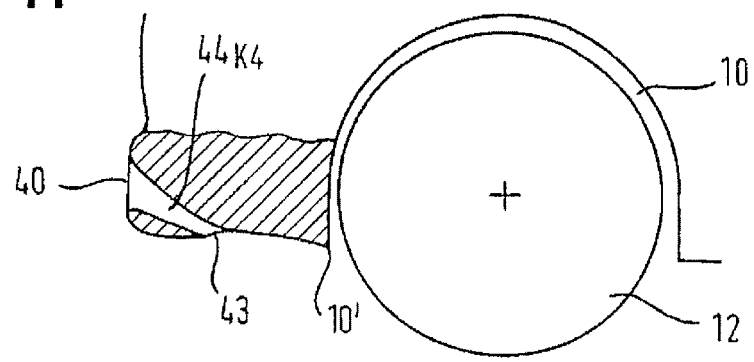
FIG. 11 is a side view according to FIG. 3 with a fourth duct geometry.

FIG. 11 illustrates a further duct geometry of the flow duct $44_{K4}$, in which the flow duct $44_{K4}$ runs from the air inlet 40 inclined obliquely rearward and downward approximately at an angle of 45° to the exit opening 43 and is greatly constricted here. The duct geometry therefore corresponds approximately to the front part of a venturi tube as far as the neck, but without having the diffuser typical of a venturi tube. In this duct configuration, the exit opening 43 lies even further forward than in the example of FIG. 10 and is located approximately at half the distance between the air inlet 40 and the front edge 10' of the wheel house 10. At the air outlet formed by the exit opening 43, this duct geometry delivers a greatly accelerated, obliquely rearwardly and downwardly directed duct flow which, because of its accelerated flow speed, exerts a great displacement effect on the underflow.

Figure 12:
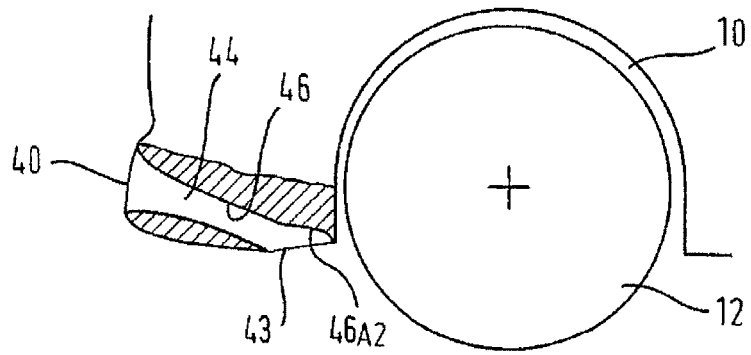
FIG. 12 is a view according to FIG. 8 with a first modified profile of the upper wall of the flow duct in the rear region above the exit opening.
Figure 13:
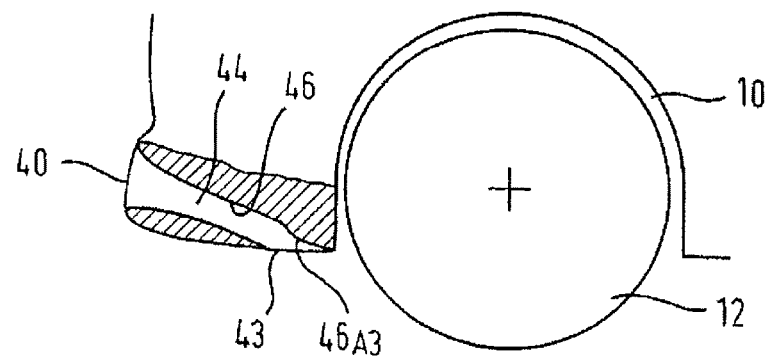
FIG. 13 is a view according to FIG. 8 with a second modified profile of the upper wall of the flow duct in the rear region above the exit opening.
Figure 14:
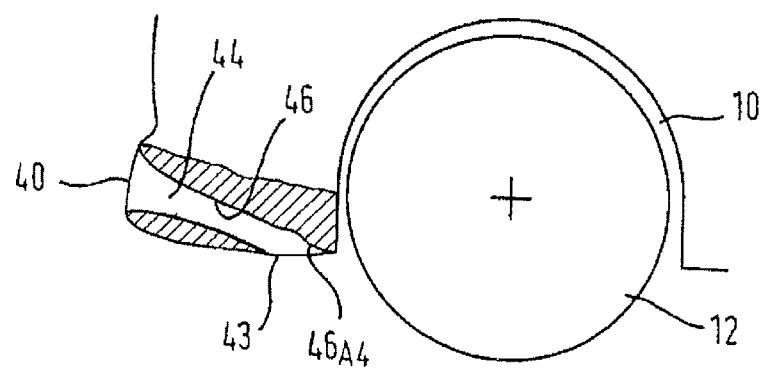
FIG. 14 is a view according to FIG. 8 with a third modified profile of the upper wall of the flow duct in the rear region above the exit opening.

FIGS. 12 to 14 show, using the example of the duct geometry of FIG. 8, the provision of different outlet geometries of the respective flow duct 44 in the region of the exit opening 43.

The upper wall 46 of the flow duct 44 can have an upwardly directed concave bulge 46$_{A2}$ in the region of the exit opening 43, as is illustrated in FIG. 12, or a downwardly directed convex bulge 46$_{A3}$ as is illustrated in FIG. 13. Alternatively, the upper wall 46 of the flow duct 44 can also have a combination of the configurations according to FIGS. 12 and 13 in the region of the exit opening 43 and can therefore form a concave-convex profile 46$_{A4}$, as illustrated in FIG. 14, wherein the convex part is provided behind the concave part in the direction of travel F. The modifications of the outlet geometry of the duct 44 that are illustrated in FIGS. 12 to 14 can be provided, of course, not only for the duct geometry 44$_{K1}$ of FIG. 8, but also for the duct geometries shown in FIGS. 9 to 11.

Figure 15:
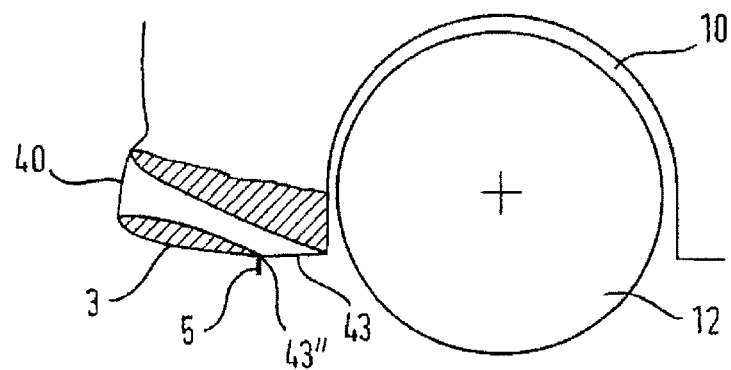
FIG. 15 is a view according to FIG. 3, in which the underbody is provided with a spoiler lip.
Figure 16:
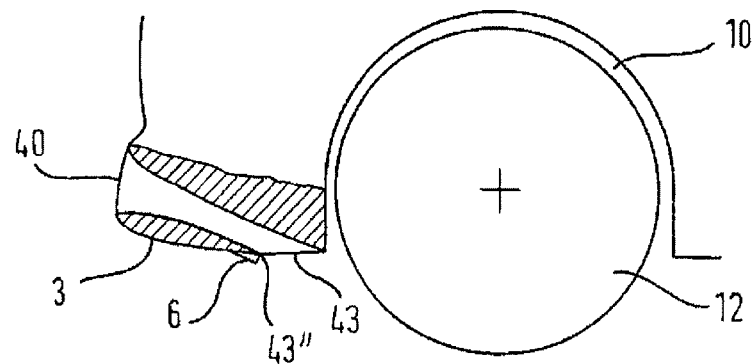
FIG. 16 is a view according to FIG. 3, in which the underbody is provided with a displacer.

Irrespective of the configuration of the duct geometry and of the outlet geometry, the front edge 43" of the respective exit opening 43 can be provided with a ram lip 5 which protrudes downward, as is illustrated in FIG. 15. Instead of the ram lip 5, a displacer 6 which protrudes downward from the underbody 3, as illustrated in FIG. 16, can alternatively also be provided. The ram lip 5 or the displacer can also be provided in front of the front edge 43" in the direction of travel.

Figure 17:
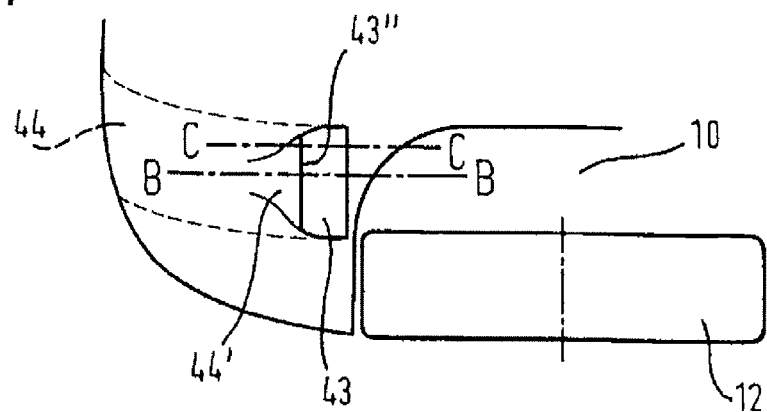
FIG. 17 is a view according to FIG. 2, in which the lower wall of the flow duct is provided with an NACA inlet in front of the exit opening.
Figure 17A:
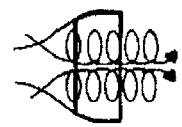
Figure 17B:
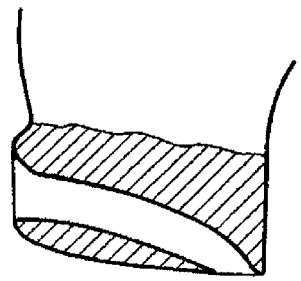
FIG. 17B is a vertical section through the flow duct of FIG. 17 along the line B-B in FIG. 17.
Figure 17C:
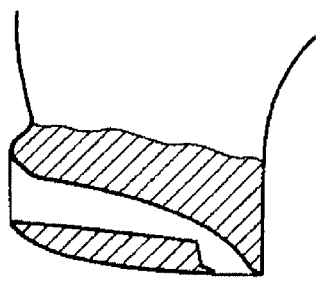
FIG. 17C is a vertical section through the flow duct of FIG. 17 along the line C-C in FIG. 17.

FIG. 17 shows a further modified configuration of the flow duct 44 in a view corresponding to FIG. 2 in which a depression 44' of the flow duct 44 is provided in front of the front edge 43" of the outlet opening 43, said depression starting from the center of the duct and expanding to the sides of the flow duct 44 and leading to the outlet opening 43 and being designed in the manner of an NACA countersunk inlet. FIG. 17A shows that this configuration of the flow duct 44 with the duct depression 44' leads to the production of the two vortices which are located laterally next to each other and rotate in opposite directions and exit through the exit opening 43 and impinge against the underflow W2. It can be seen in FIG. 17B and FIG. 17C that the profile of the flow duct 44 and the contour thereof in the center of the duct corresponds to the duct contour of the flow ducts described up to now, for example to the embodiment of FIG. 8, while the flow duct has a lower height toward the side edges and extends abruptly downward. The resulting different flow conditions in the center of the duct and at the edge of the duct ensure the swirling of the duct flow that is shown in FIG. 17A.

Figure 18:
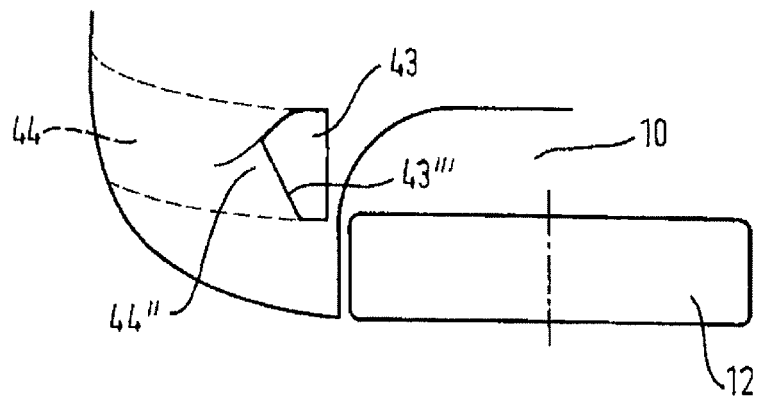
FIG. 18 is a view according to FIG. 2, in which the lower wall of the flow duct is provided on one side with a countersunk NACA-like inlet.
Figure 18A:
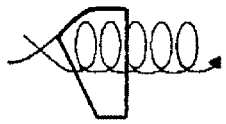

FIG. 18 shows another modified configuration of the flow duct 44 in a view corresponding to FIG. 2 in which a depression 44" of the flow duct 44 is provided in front of the obliquely running front edge 43''' of the outlet opening 43, said depression 44" being positioned on one side of the flow duct 44 and extending to the other side of the flow duct 44 and leading to the outlet opening 43 and being designed similarly to a NACA countersunk inlet. FIG. 18A shows that this configuration of the flow duct 44 with the duct depression 44" which is asymmetric with respect to the center of the duct leads to the production of a vortex which exits through the exit opening 43 and impinges against the underflow W2.

Figure 19:
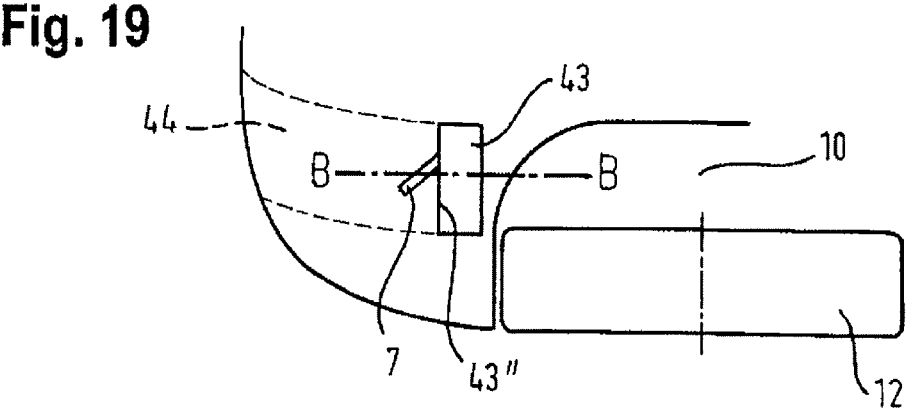
FIG. 19 is an illustration of FIG. 2 with a vortex generator provided on the lower wall of the flow duct in front of the exit opening.
Figure 19A:
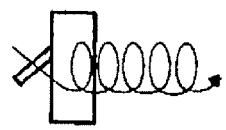

FIG. 19 shows yet another modified configuration of the flow duct 44 in a view corresponding to FIG. 2, wherein a vortex-generating element 7 is provided in the flow duct 44 in front of the front edge 43" of the outlet opening 43, as seen in the direction of travel F. As illustrated in FIG. 19, said vortex-generating element 7 can be an interfering body which is rectangular in cross section or can be of curved cross-sectional design. In the example of FIG. 19, the vortex-generating element 7 is at an oblique angle, for example of approximately 45°, to the front edge 43" of the exit opening 43 of rectangular configuration. FIG. 19A shows the vortex generated by the vortex-generating element 7.

Figure 19B:
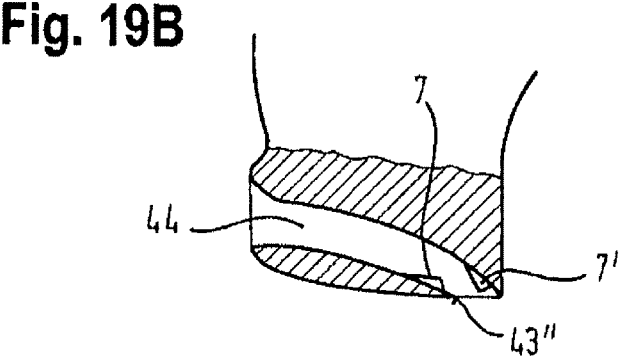
FIG. 19B is a vertical section through the flow duct of FIG. 19 along the line B-B in FIG. 19.

FIG. 19B shows, in a vertical section, the arrangement of the vortex-generating element 7 on the lower duct wall just in front of the exit opening 43. FIG. 19B furthermore shows an upper vortex-generating element 7' as an alternative or in addition to the lower vortex-generating element 7 provided on the lower duct wall, said upper vortex-generating element 7' being provided on the upper duct wall in the region of the exit opening 43 and extending into the flow duct.

The embodiments of the invention are not restricted to the above exemplary embodiment which serves merely to generally explain the core concept of the invention. On the contrary, within the scope of protection the device according to the invention may also take on different embodiments than those described above. The device here may have features in particular which constitute a combination of the respective individual features of the claims.

Reference signs in the claims, the description and the drawings serve merely for better understanding of the embodiment of the invention and are not intended to restrict the scope of protection.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A motor vehicle comprising:
   a body having a front apron; and
   an underbody, wherein
   the body forms at least one left and one right front wheel house for receiving one front wheel each,
   duct-like air-guiding devices are provided in the front apron, said air-guiding devices having an air inlet in the region of the front of the vehicle and an air outlet in the region of the underbody,
   the air-guiding devices have at least one left flow duct and at least one right flow duct,
   the at least one left flow duct opens in the underbody in front of the left wheel house,
   the at least one right flow duct opens in the underbody in front of the right wheel house,
   the respective exit opening forming the air outlet is designed in such a manner that the air flowing through the flow duct exits counter to the direction of travel with a direction component downward, and the respective exit opening is arranged in front of that region of the respective wheel house which is adjacent to the inner side, which faces the vehicle central plane, of the respective vehicle wheel in the straight-ahead position.

2. The motor vehicle as claimed in claim 1, wherein the position of the respective exit opening and the extent thereof in the transverse direction of the vehicle are dimensioned in such a manner that the exit opening takes up or overlaps the distance from the inner side, which faces toward the vehicle center plane, of the respective vehicle wheel in the straight-ahead position as far as the inner side of the wheel house, the inner side facing the respective vehicle wheel, so that the entire width of that free part of the wheel house which is not taken up by the vehicle wheel in the straight-ahead position.

3. The motor vehicle as claimed in claim 2, wherein the respective exit opening has an exit cross section which is provided, at least on one longitudinal side, with a contour differing from a straight line.

4. The motor vehicle as claimed in claim 3, wherein the contour differing from the straight line is of stepped, zigzag shaped or wavy design or is provided with convex bulges lying laterally against one another.

5. The motor vehicle as claimed in claim 4, wherein the respective exit opening is of rectangular design in outline and is preferably arranged at a right angle to the vehicle central plane.

6. The motor vehicle as claimed in claim 4, wherein the contour of the respective exit opening is of curved design in outline, wherein its curvature substantially corresponds to the curvature of the front edge of the wheel house, as viewed in outline, or is approximate to said curvature.

7. The motor vehicle as claimed in claim 6, wherein at least one vortex-generating element is provided in front of the exit opening in the respective flow duct.

8. The motor vehicle as claimed in claim 7, wherein a ram lip or a displacer which protrudes downward from the underbody is provided on or in front of the front edge of the respective exit opening.

9. The motor vehicle as claimed in claim 8, wherein the upper wall of the flow duct is of concave, convex or concave-convex design in the region of the respective exit opening.

10. The motor vehicle as claimed in claim 9, wherein the upper wall of the flow duct has a concavely, convexly or concavely-convexly curved profile over the course of the flow duct.

11. The motor vehicle as claimed in claim 1, wherein the direction component downward deflects an underflow, which flows below the flow duct, away from a negative pressure field formed in the wheel house in front of the front wheel.

* * * * *